United States Patent
Gleeson et al.

(10) Patent No.: US 6,782,428 B1
(45) Date of Patent: Aug. 24, 2004

(54) ALLOCATION OF ASYMMETRIC PRIORITY TO TRAFFIC FLOW IN NETWORK SWITCHES

(75) Inventors: Michael J Gleeson, Dublin (IE); Paul O'Keeffe, Dublin (IE); Kevin Jennings, Dublin (IE); Jerome Nolan, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 574 days.

(21) Appl. No.: 09/689,628

(22) Filed: Oct. 13, 2000

(30) Foreign Application Priority Data

May 23, 2000 (GB) .............................................. 0012472

(51) Int. Cl.[7] ........................ G06F 15/16; G06F 15/173; H04L 12/40
(52) U.S. Cl. ........................ 709/233; 709/227; 709/238; 370/395.21; 370/395.31
(58) Field of Search ................................ 709/233, 227, 709/228, 229; 370/395.4, 395.42, 395.21, 395.31; 340/825.5, 825.51

(56) References Cited

U.S. PATENT DOCUMENTS

| | | | | | |
|---|---|---|---|---|---|
| 4,819,229 | A | * | 4/1989 | Pritty et al. | 370/455 |
| 5,940,390 | A | * | 8/1999 | Berl et al. | 370/389 |
| 6,304,908 | B1 | * | 10/2001 | Kalajan | 709/229 |
| 6,347,087 | B1 | * | 2/2002 | Ganesh et al. | 370/392 |
| 6,449,647 | B1 | * | 9/2002 | Colby et al. | 709/226 |
| 6,501,760 | B1 | * | 12/2002 | Ohba et al. | 370/395.42 |

OTHER PUBLICATIONS

Sherman, Doug; "Tackling the p's and q's of LAN Traffic"; Network World; Sep. 1998; p. 33.*

Passmore, David; "Quality of service in the LAN. local area networks"; Business Communication Review; Jun. 1999.*

Jonathan Bransky and L. David Passmore. Retrieved "Layer 4 Switching" White Paper Sep. 1997 from http://penguin.cc.edu/network/L4_switching.html in Nov. 2003.*

Conover, Joel. Retrieved "Layer 4 Switching: Unraveling the 'Vendorspeak'" Article May 1999 from http://www.networkcomputing.com/shared/printArticle.jhtml?article=/1009/1009ws1full.html&pub=nwc in Nov. 2003.*

Harbaum et al. "Layer 4+ switching with QoS support for RTP and http" Global Telecommunications Conference, 1999. GLOBECOM '99, vol.: 2, 1999 pp.: 1591–1596 vol. 2.*

* cited by examiner

*Primary Examiner*—Marc D. Thompson
*Assistant Examiner*—Tam T. Phan
(74) *Attorney, Agent, or Firm*—Nixon & Vanderhye PC

(57) ABSTRACT

Controlling the allocation of priority for data packets within a multi-port switch includes detecting the commencement of an HTTP message; enabling the storage of an identification of the source port on which that message was received by the switch; finding correspondence between destination data of packets and the said source port; and adjusting a priority allotted to said packets in response to the correspondence. The adjustment of priority preferably increases the priority of packets forwarded to said the port relative to priority allotted packets received at the source port and thereby allots asymmetric priority to traffic between a server and a client.

12 Claims, 8 Drawing Sheets

ALLOCATION OF ASYMMETRIC PRIORITY TO TRAFFIC FLOW IN NETWORK SWITCHES

FIELD OF THE INVENTION

This invention relates to switches for packet-based data communication networks wherein messages in the form of addressed data packets are conveyed from, for example, user to server and from server to user by way of at least one switch which can respond to address data within a packet to determine an egress port or ports. The invention more particularly relates to the allocation of priority to different classes of traffic.

BACKGROUND TO THE INVENTION

Data packets of the kind to which the invention relates are intended to conform to the OSI model in that they will normally include source and destination media access control addresses, otherwise known as 'layer 2' addresses in the OSI model, network or protocol addresses of the entities which are communicating, further information, called herein 'higher layer' information identifying for example the 'application' which the entities are operating to exchange information, message data and, conventionally, cyclic redundancy code data. As is well known, not all packets will conform to such a format precisely, since the exchange of information between entities, such as a user and a server, may require initially the discovery of appropriate address data by means of an address resolution protocol, but it is assumed in the following that two entities have begun to exchange data using packets conforming to the aforementioned general format.

In order to ameliorate the effects of congestion in networks, it is customary for different types of traffic to be accorded different priority levels. For example, control frames or packets sent by a management entity to a particular designation may be accorded a high priority whereas other traffic may be accorded a low priority. Once a given type of traffic is allocated a particular priority, tile priority may be indicated and implemented in a variety of ways. Which of these is selected is not important to the present invention. Some ways of implementing it will be discussed in relation to a specific example.

SUMMARY OF THE INVENTION

For a variety of different applications, for example those relating to HTTP (hypertext transmission protocol) the bandwidth requirement for traffic from the server to the 'client' far exceeds the requirement for bandwidth from the 'client' to the server. Typically the ratio of the requirements for bandwidth is 5 to 1 or greater. Where conversations (the exchange of messages) are allocated the same priority in both directions there is a substantial waste of the bandwidth allocated to the messages passing from client to server.

The present invention is based on the detection of the commencement of a conversation by recourse to higher layer information, that is to say layer 4 or above, to provide storage of the source port associated with the message and to allocate traffic which passes through the switch with a destination port equal to the stored or latched source port a higher priority. That technique will allow server-client traffic to have a higher priority than client server traffic and avoid the wastage of bandwidth noted above.

Further features and benefits of the present invention will become apparent during the following detailed description with reference to the accompanying drawings.

DETAILED DESCRIPTION OF A PREFERRED EXAMPLE

Figure 1:
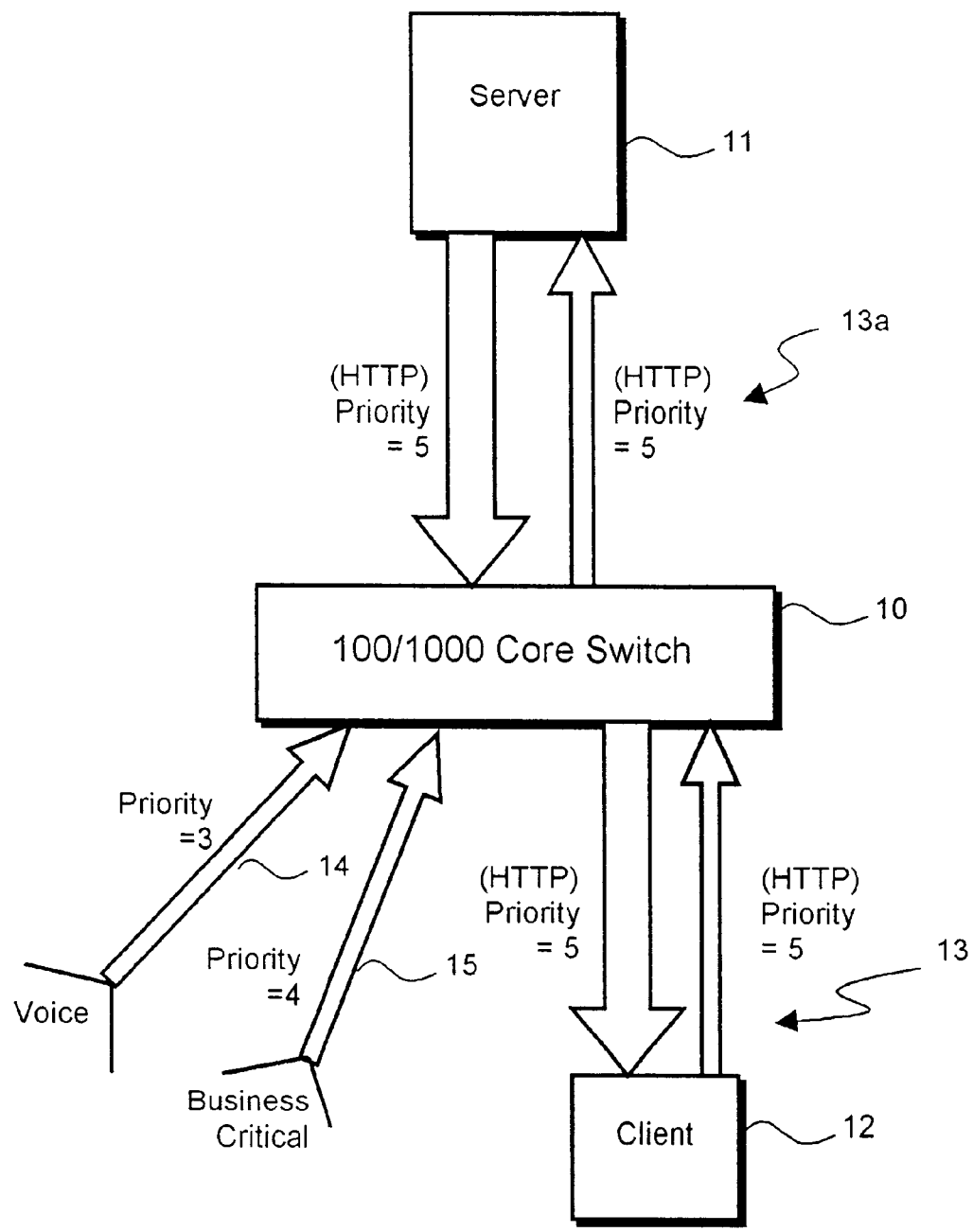
FIG. 1 is an explanatory diagram of a packet-based network showing different types of traffic therein.

FIG. 1 of the drawings illustrates in simplified form a network including a switch 10, for example a switch capable of operating at 100 megabits per second or 1000 megabits per second, disposed between a client, for example a user terminal such as a personal computer, and a server 11. Traffic flowing between the client and the server is shown as traffic 13 in the section between the client 12 and the switch 10 and as traffic flow 13a between the switch 10 and the server 11. The course which is also shown as receiving traffic 14 from a voice source and traffic 15 from a 'business critical' source.

For the sake of example, the traffic 13, 13a is shown as 'HTTP' traffic, arising from a request by the client to a web site for information thereon and the provision of information from the web site, handled by server 11.

It is assumed just for the sake of example that the voice traffic 14 has a priority '3', the 'business critical' has a priority 4 and the HTTP conversation between server and client has a priority 5 (the highest).

It is customary for switches such as core switch 10 to include a variety of conversation tables, identified by source/destination pairs and to allocate priority to those conversations. Such priority may be determined by an examination of protocol data within the packets as discussed for example in GB patent application number 9908125.9. Nevertheless priority may be imposed for certain types of traffic by means of a network administrator.

Where traffic is allocated on a source/destination (conversation) basis, it is symmetric, in that no distinction is drawn between traffic from client to server and traffic from server to client, thus, if HTTP traffic is allocated priority 5, it will have that priority for both directions, as shown in FIG. 1.

Figure 2:
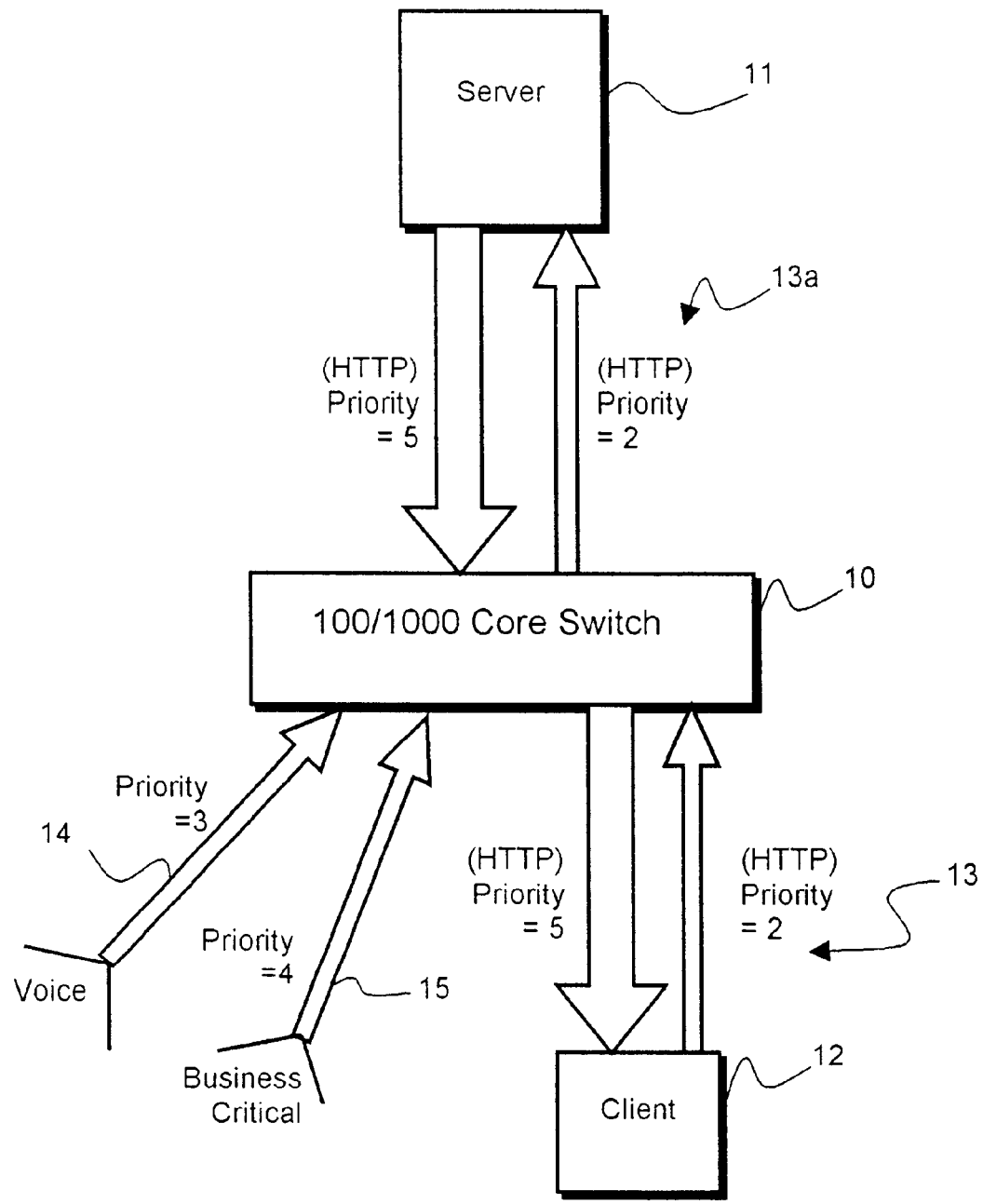
FIG. 2 is another diagram of the network showing the modification of priority allocated to certain types of traffic.

FIG. 2 illustrates the intended effect of the present invention, in that the traffic 13 passing from client to switch will necessarily be set with a low priority but on the detection of an HTTP conversation the traffic from switch to client will be allocated a priority '5'.

As will be made apparent later, the present invention may be implemented in practice by means of 'snooping' on packets which pass through a switch so as to detect the start of a conversation denoted by an HTTP (hypertext transmission protocol) packet from the client to the server, latching the value of the destination port and employing that detection to latch a source port number (normally but not essentially a 16-bit number) so that this latched port number can be compared with a destination port in a packet of a 'server to client' conversation and on detection of a match to set a higher priority for the server/client messages. Before that process can be fully explained, it is expedient to describe the general features of a switch in which the present invention can be performed and also to explain the manner in which priority may be allotted in a switch of that nature.

Figure 3:
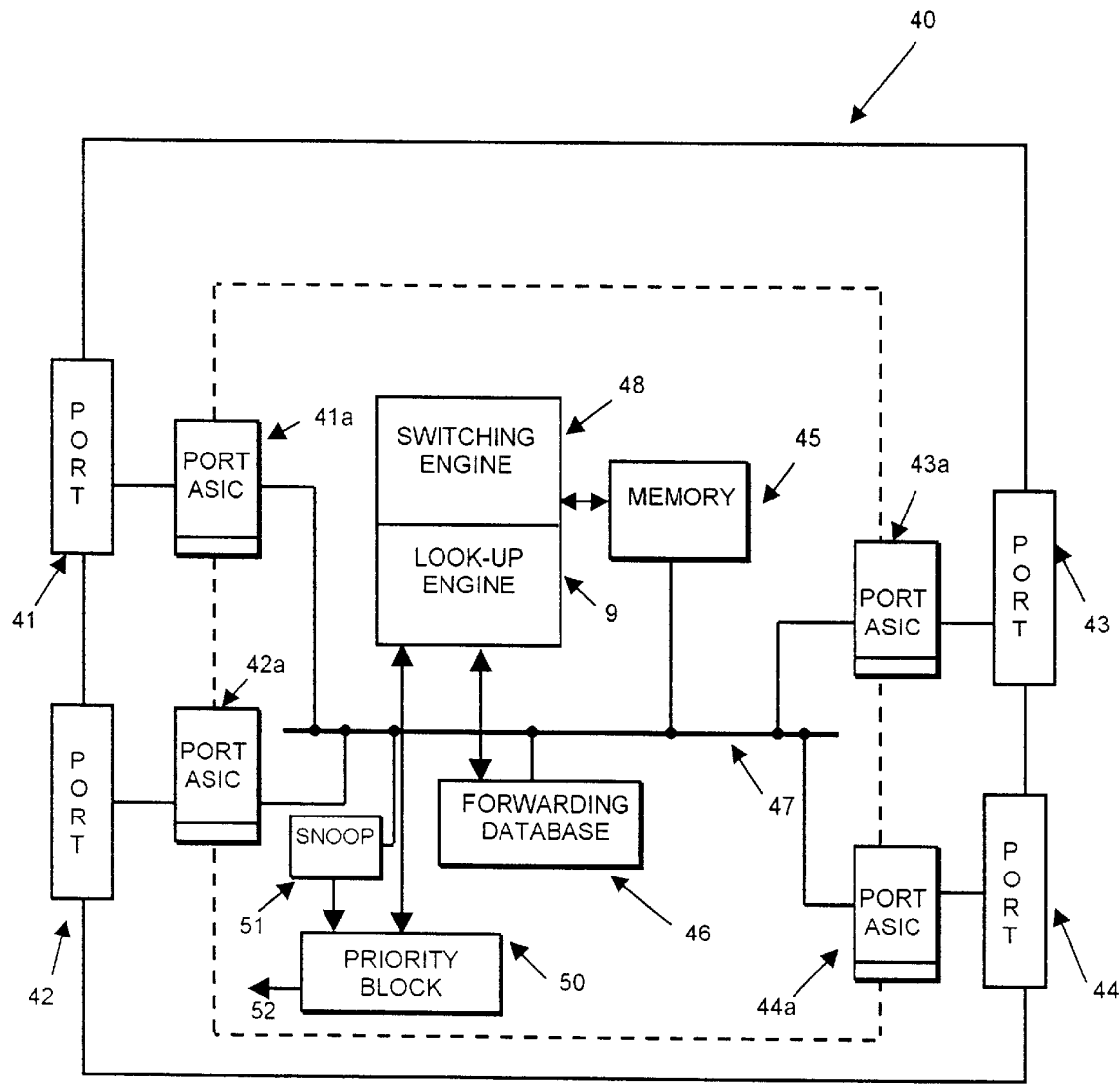
FIG. 3 is a generally conventional diagram of a switch within which the invention may be implemented.

FIG. 3 illustrates for the sake of example a typical switch 40 within which the invention may be performed. A core switch such as switch 10 commonly has a larger multiplicity of ports but for the sake of simplicity the switch 40 shown in FIG. 3 has four ports 41, 42, 43 and 44. Each of these is associated with a respective port ASIC 41a to 44a respectively. The port ASICs each have some means of applying priority to traffic passing through the switch. The switch includes a memory 45 for the temporary storage of packets between the time they are received and are forwarded to their respective port or ports. The forwarding of packets is controlled by means of a forwarding database 46 (relating destination addresses with specific port numbers). The forwarding database is accessed by means of a look-up engine 49 which operates in conjunction with a switching engine 48 to retrieve packets from memory 45 and to direct them to their respective locations. The allocation of priority to switches is shown schematically by a priority block 50. The snooping of packets between the port ASIC and memory 45 is shown by the snoop block 51 and the control of the ASICs by means of priority block 50 is shown by arrow 52. The port ASICs 41–44, memory 45, forwarding database 46, switching engine 48, look-up engine 49, priority block 50 and snoop block 51 are connected to each other through bus 47.

Figure 4:
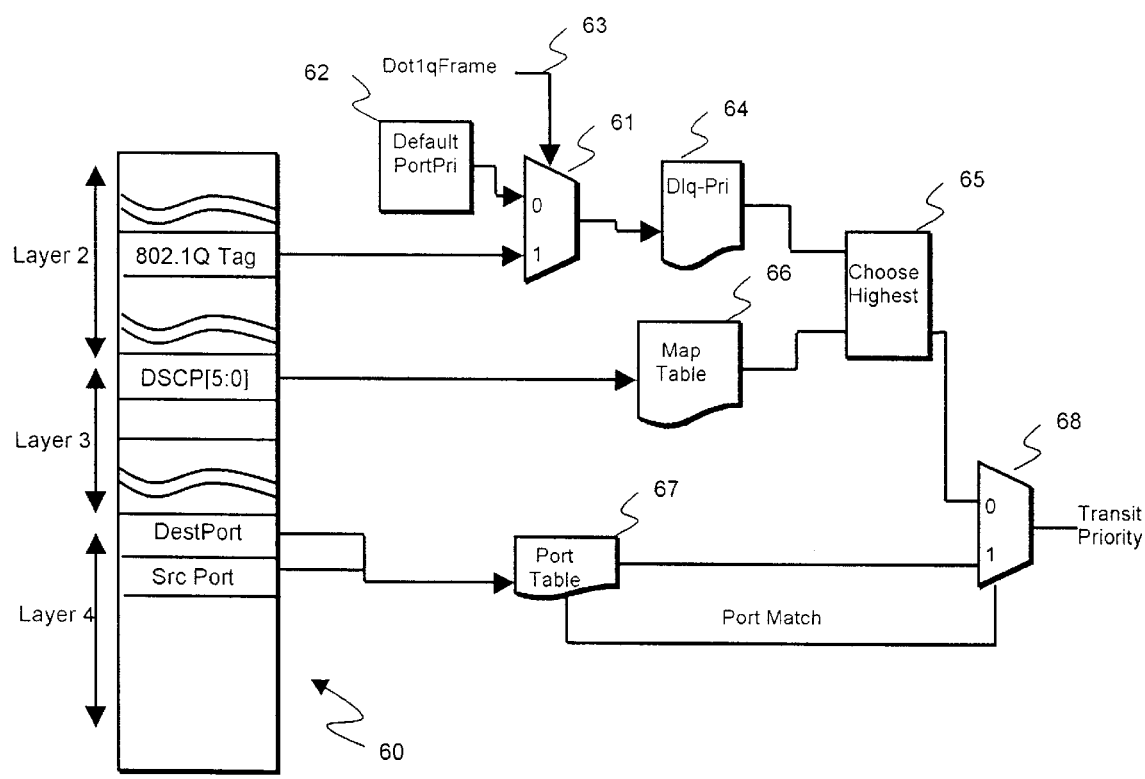
FIG. 4 is a diagram illustrating the determination of a transit priority in a switch.

FIG. 4 illustrates how a packet passing through a switch is allocated a 'transit priority' which it carries through the system. Such a transit priority is used (as is well known in itself) to determine the priority of transmission of packets from the switch or from individual ports by means of transmit queues which are allocated different priorities and which can be selected in accordance with the transit priority. The internal transit priority can be mapped to a priority field, specifically a 802.1q field for an Ethernet packet if the packet is to be sent out on a link which is configured for the transmission of packets containing a priority tag field. FIG. 4 illustrates in particular how the priority of a packet is determined having regard to various priority values associated with different fields in the header of the packet and other indications of priority.

In FIG. 4, the numeral 60 denotes in simplified form part of an Ethernet packet and particularly part of the header of it. Typically an Ethernet packet contains 'layer 2' information constituted by destination address data (which may be a single destination MAC address in the case of a unicast packet or a group address in the case of a multicast packet), a source MAC address and, in this example, an 802.1q tag which defines a priority for the packet in terms of a 3-bit field, the value corresponding to zero representing the lowest priority. The packet 60 also contains 'layer 3', or 'IP' data which may comprise an IP or network destination address and source address and which, in this example, contains a network priority field known as a DSCP (Differential Services Code Point) field conventionally consisting of a 6-bit field. Further, the packet contains higher layer information, particularly in this example 'layer 4' information in the form of UDP/TCP destination and source port numbers, shown in packet 60 by the legends 'DestPort' and 'Src Port' respectively.

Furthermore, the port on which the packet is received may have a priority allotted to it.

In the present example, a multiplexer 61 receives at one input a priority value which represents the default priority 62 of the port on which the packet was received. The packet is 'parsed' that is to say routinely examined to determine whether it has an 802.1q tag, and, if the packet has such a tag, a relevant signal is asserted on a select line 63 to allow multiplexer 61 to select the priority determined in the 802.1q tag field instead of the default priority associated with the receiving port. The priority value obtained at the output of multiplexer 61 is converted by a mapping table 64 to an internal priority. This priority is hierarchical so that the greater the number the higher the priority. If the table receives at its input a value which is not applicable, for example from an non-IP frame, then it sets an internal priority at the lowest value (zero).

A decision circuit 65 is arranged to choose the higher priority obtained from the mapping table 64 and a further mapping table 66 which converts the DSCP value to a 3-bit internal priority. The value selected by decision circuit 65 will become the transmit priority unless an examination of layer 4 (or higher layer) source and destination address yields a match as about to be described.

The values 'DestPort' and 'SrcPort' obtained from the 'layer 4' fields in packet 60 are coupled to a port table 67 which has the effect of an associative store indexed on the (16-bit) port number. If the port is found in the table then the result is a 3-bit priority value. This port priority will override the priority value obtained from the 'media access control' and protocol priorities. Thus if there is a match in the port table a multiplexer 68, which has a default setting to choose the output of decision circuit 65 is controlled to select tile priority value obtained from the port table 67. The result at the output of multiplexer 68 is a 'transit' priority which is always a 3-bit number. The advantage of this is that it allows a simple re-mapping to an appropriate 802.1q field on a packet output from the switch.

Figure 5:
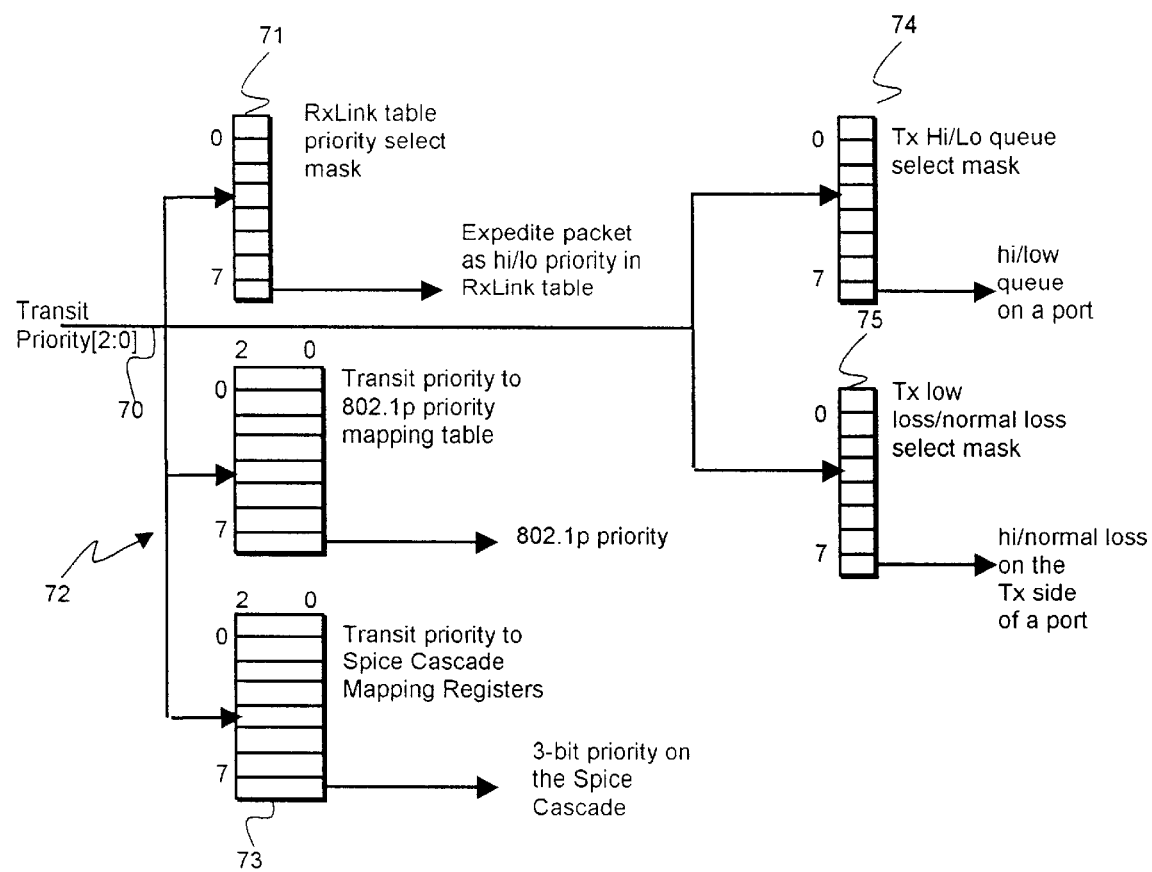
FIG. 5 is another diagram illustrating the use of the transit priority.

FIG. 5 shows how a transit priority may typically be used in a switch. The transit priority value appears on a line 70 and is coupled to a multiplicity of registers (71 to 75). These define various bit masks and are accessed by the transit priority. Register 71 is the Rx link table priority select mask which provides priority for extracting packets from a receive queue Register 74 is a mapping of a transit priority to an 802.1p priority mapping table. Register 73 provides priority on a 'cascade'. Register 74 provides a mask for a transmit queue and register 75 provides a Tx low loss/normal loss select mask.

Figure 6:
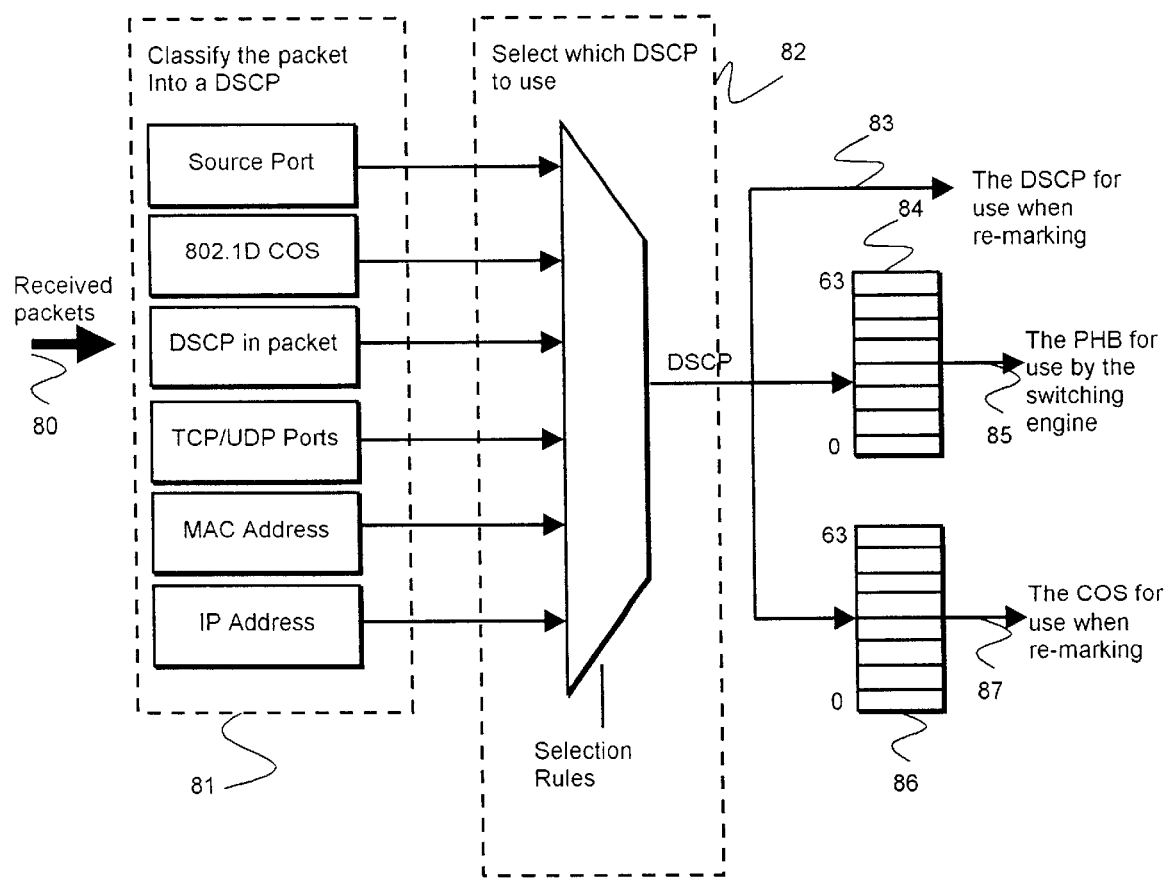
FIG. 6 is a diagram of a 'quality of service' classification.

TCP/UDP port number matching may also be used for quality of service support, as shown in FIG. 6. Received packets 80 may be parsed to make available various data relating to the packet, particularly the source port, the 802.1d COS (Conditions of Service), the DSCP, the TCP-UDP ports, the MAC address and the IP address. Which of the relevant data is selected depends upon selection rules as shown by block 82. The DSCP priority may be fed out on line 83 or connected to registers 84, 86 to provide the PHB 85 (Per Hop Behaviour) for use by the switching engine or the COS value 87 for use when re-marking.

There are therefore a variety of schemes for controlling priority within a switch from the transit priority.

Figure 7:
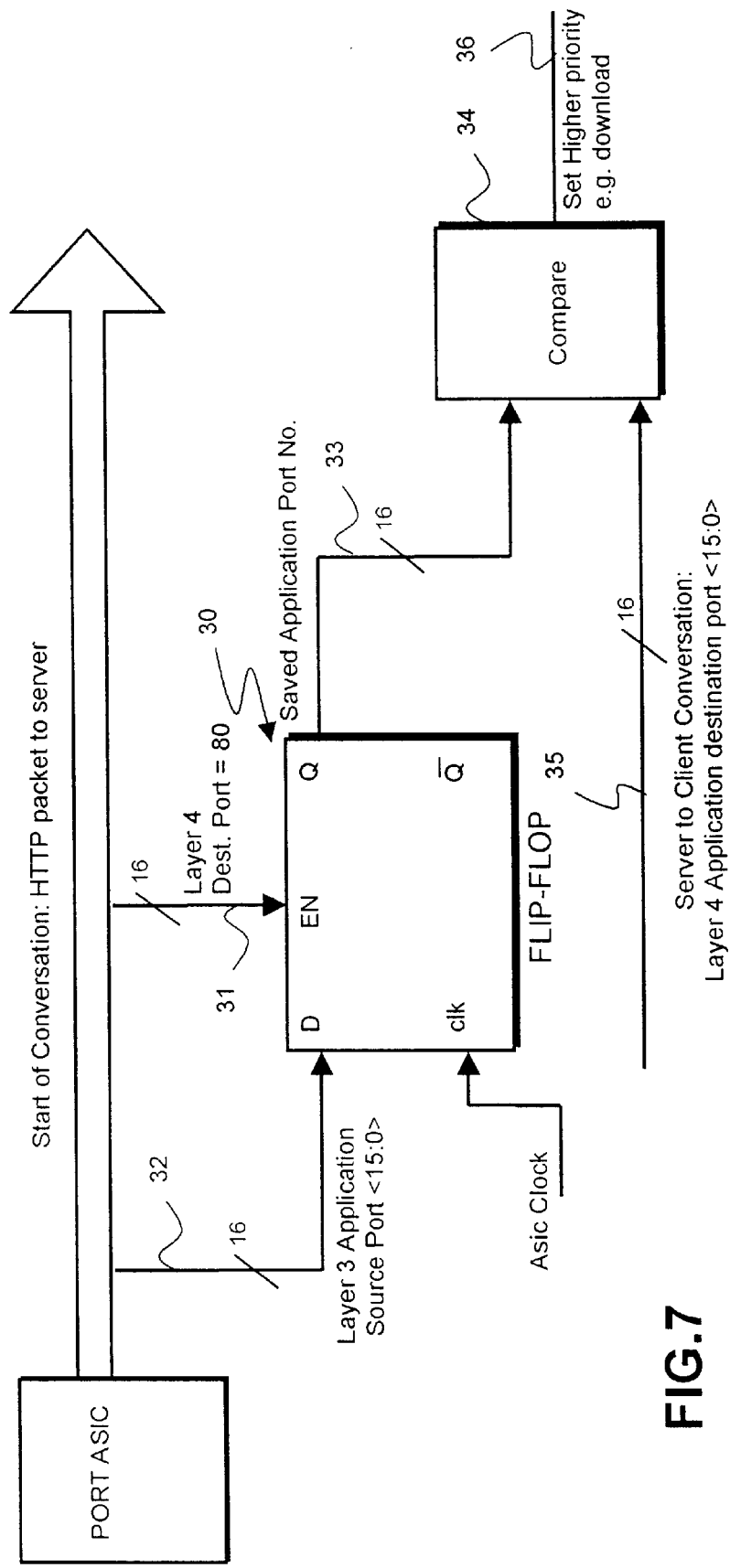
FIG. 7 is a schematic diagram illustrating the implementation of the invention.

FIG. 7 illustrates the manner in which a packet may be snooped in order to provide a different priority which may be superimposed on the existing priority schemes. An HTTP packet from a client to a server is snooped as shown by line 31 which provides an enable for a set of 16 flip flops constituting a register 30 which is used for latching the source port provided on line 32 for the switch. The saved application port number provided on line 33 can be compared in comparator 34 with 'destination' ports of packets proceeding from server to client on line 35 to provide on line 36 a higher priority for a download.

In practice, FIG. 7 is integrated with the scheme shown in FIG. 5 by including (or storing) the latched source port number in table 67, so that the function of the comparator is performed by the look-up process associated with the table. Alternatively the latched source port number may be included in the 'TCP/UDP ports' data in block 81 of FIG. 6.

Figure 8:
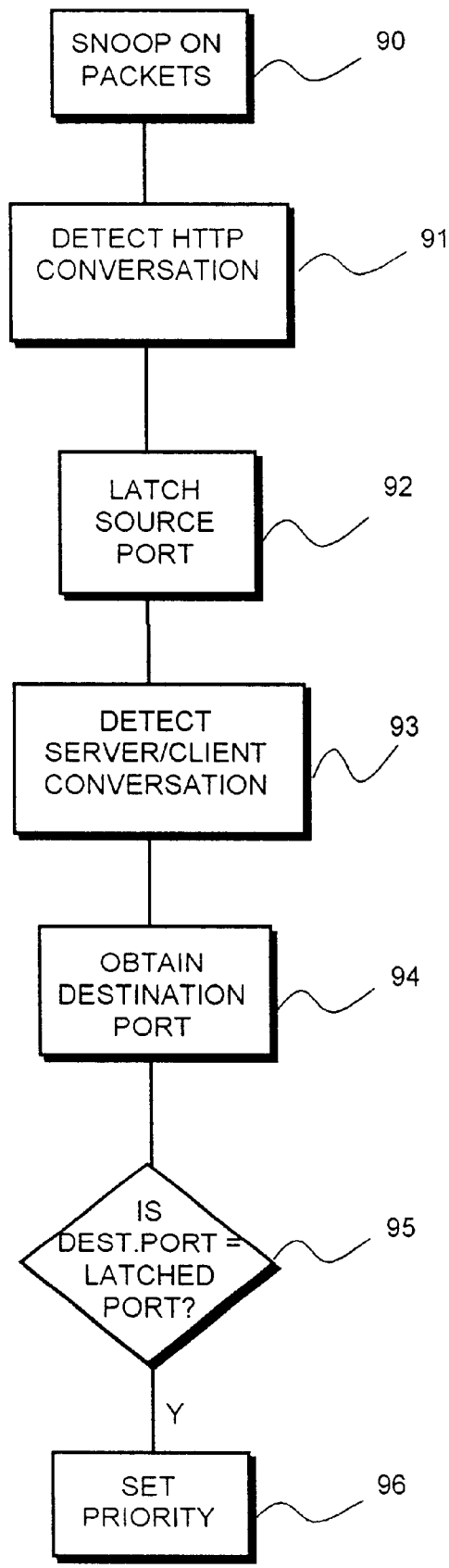
FIG. 8 is a flow diagram of a process according to the invention.

FIG. 8 illustrate the process of the present invention. Stage 90 is the snooping on packets, stage 91 the detection of the start of an HTTP conversation, stage 92 the latching of the source port, stage 93 the detection of a server/client conversation, stage 94 the obtaining of the destination port, stage 95 the comparison of the destination port with the latched port and finally stage 96 represents the setting of priority.

What is claimed is:

1. A method of controlling the allocation of priority for data packets within a multi-port switch, comprising:
    (a) receiving at the switch from a source a first packet which includes a header containing network address data and higher level data including a notional source port number and a notional destination port number;
    (b) setting a first transit priority for said first packet through said switch;
    (c) detecting said notional destination port number and in response thereto storing said notional source port number;
    (d) forwarding said first packet to said server from said switch;
    (e) receiving from said server a second packet including address data identifying said source and higher level data including a respective notional destination port number;
    (f) detecting a match between said respective notional destination port number and said notional source port number; and
    (g) setting the priority for passage through said switch for said second packet to a second transit priority higher than said first transit priority.

2. A method of controlling the allocation of priority for data packets within a multi-port switch, comprising:
    (a) receiving at the switch from a source a first packet which includes a header containing network address data and higher level data including a notional source port number and a first notional destination port number;
    (b) responding to said notional source port number and notional destination port number to set a first transit priority through the switch for said first packet;
    (c) enabling the storage of said notional source port number in response to said first notional destination port number;
    (d) forwarding said first packet to said server from said switch;
    (e) receiving from said server a second packet including address data identifying said source and higher level data including a second notional destination port number;
    (f) detecting a match between said second notional destination port number and said notional source port number; and
    (g) setting the priority for passage through said switch for said second packet to a second transit priority higher than said first transit priority.

3. A method as in claim 2 wherein said first notional destination port number identifies said first packet as a hypertext transmission protocol request packet.

4. A method of controlling the allocation of transit priority for data packets between a source and a server, comprising the steps of:
    (a) receiving from at least one source packets which include a respective header containing network address data and higher level data including a notional source port number and a first notional destination port number,
    (b) allocating a respective transit priority through the switch for each of said packets;
    (c) maintaining a table of notional port numbers;
    (d) in response to a match between a number in said table and at least one of said notional source port number and first notional destination port number in a given packet, over-riding said respective transit priority to set a first transit priority for said given packet;
    (e) enabling the storage of said notional source port number in response to said first notional destination port number when said first notional destination port number has a particular value;
    (f) forwarding said first packet to said server;
    (g) receiving from said server a second packet including network address data and higher level data including a second notional destination port number; and
    (h) detecting a match between said second notional destination port number and said stored notional source port number; and in response thereto setting the transit priority for said second packet to a second transit priority.

5. A method as in claim 4 wherein said particular value identifies a hypertext transmission protocol request packet.

6. A multi-port network switch for the transmission of packets between a source and a server messages, said switch being organized:
    (a) to receive from a source a first packet which includes a header containing network address data and higher level data including a notional source port number and a notional destination port number;
    (b) to set a first transit priority for said first packet through said switch;
    (c) to detect said notional destination port number and in response thereto storing said notional source port number;
    (d) to forward said first packet to said server;
    (e) to receive from said server a second packet including address data identifying said source and higher level data including a respective notional destination port number;
    (f) to detect a match between said respective notional destination port number and said notional source port number; and
    (g) to set the priority for passage through said switch for said second packet to a second transit priority higher than said first transit priority.

7. A multi-port network switch for the transmission of packets between a source and a server, said switch being organized:
    (a) to receive at the switch from a source a first packet which includes a header containing network address data and higher level data including a notional source port number and a first notional destination port number;

(b) to respond to said notional source port number and notional destination port number to set a first transit priority through the switch for said first packet;

(c) to enable the storage of said notional source port number in response to said first notional destination port number;

(d) to forward said first packet to said server;

(e) to receive from said server a second packet including address data identifying said source and higher level data including a second notional destination port number;

(f) to detect a match between said second notional destination port number and said notional source port number; and (g) to set the priority for passage through said switch for said second packet to a second transit priority higher than said first transit priority.

8. A multi-port network switch for the transmission of packets between a source and a server, said switch being organized:

(a) to receive from at least one source packets which include a respective header containing network address data and higher level data including a notional source port number and a first notional destination port number, (b) to allocate a respective transit priority through the switch for each of said packets;

(c) to maintain a table of notional port numbers;

(d) in response to a match between a number in said table and at least one of said notional source port number and first notional destination port number in a given packet, to over-ride said respective transit priority to set a first transit priority for said given packet;

(e) to enable the storage of said notional source port number in response to said first notional destination port number when said first notional destination port number has a particular value;

(f) to forward said packets to said server;

(g) to receive from said server a second packet including network address data and higher level data including a second notional destination port number; and (h) to detect a match between said second notional destination port number and said stored notional source port number; and in response thereto to set the transit priority for said second packet to a second transit priority.

9. A switch as in claim 8 wherein said second transit priority is higher than said first transit priority.

10. A method of controlling the allocation of priority for message traffic within a multi-port switch, comprising:

(a) detecting the commencement of a conversation between a client and a server by recourse to notional port number information at a higher level than network address data in a first message that commences said conversation;

(b) storing a notional source port number associated with said message;

(c) allocating a transit priority within the switch for said message; and (d) allocating to message traffic which passes through said switch with a notional destination port number equal to said notional source port number a higher priority than said transit priority of said first message.

11. A method as in claim 10 wherein said first message is a HTTP request and said message traffic is HTTP traffic.

12. A multi-port network switch for the transmission between a source requests and a server of messages, said switch being organized:

(a) to detect the commencement of an HTTP conversation between a client and a server by recourse to information at a higher level than network address data in a first message that commences said conversation;

(b) to store a notional source port number associated with said message;

(c) to allocate a transit priority within the switch for said message; and (d) to allocate to message traffic which passes through said switch with a notional destination port number equal to said notional source port number a higher priority than said transit priority of said first message.

* * * * *